United States Patent [19]

McElliott

[11] 4,123,623
[45] Oct. 31, 1978

[54] PAY TELEPHONE ALARM AND AUDIT SYSTEM

[76] Inventor: Steve I. McElliott, 3934 Lyceum Ave., Los Angeles, Calif. 90066

[21] Appl. No.: 734,812

[22] Filed: Oct. 22, 1976

[51] Int. Cl.² .......................................... H04M 17/00
[52] U.S. Cl. .................................. 179/6.3 R; 340/568; 179/2 A
[58] Field of Search .................... 179/6.3 R, 6.31, 6.4, 179/6.5, 5 R, 5 P, 2 A, 2 DP, 2 CA, 7.1 R, 7 MM, 7 R, 7.1 TP; 194/8, 16; 340/274, 276, 248D

[56] References Cited

U.S. PATENT DOCUMENTS

| | | | |
|---|---|---|---|
| 3,453,389 | 7/1969 | Shaer | 179/7.1 R |
| 3,697,695 | 10/1972 | Pommerening | 179/7 MM |
| 3,806,651 | 4/1974 | Battrick | 179/6.5 R |
| 3,891,802 | 6/1975 | Bartelink | 179/2 A |
| 3,983,551 | 9/1976 | Raymond | 340/276 |

*Primary Examiner*—Kathleen H. Claffy
*Assistant Examiner*—Gerald L. Brigance
*Attorney, Agent, or Firm*—William H. Maxwell

[57] ABSTRACT

An alarm and audit system for use with loop start telephones and with either semi-post-pay or pre-pay operations, and installed as office equipment for tabulating and storing information concerning collections from coin operated pay telephones, so as to ensure optimum collection and as a perceptive alarm against burglaries; utilizing counter means activated by coin tone bursts transmitted over a pair of normal telephone lines; in semi-post-pay phones the tone burst information being conducted directly to memory means; in pre-pay phones the tone burst information being held in abeyance to be released for tabulation in the memory means by a positive voltage applied when collecting coins, or dropped from said abeyance means by a negative voltage applied when returning coins. The tabulation is accumulative in one of two memory means selectively called upon by computer means to produce information for distribution to those concerned with servicing the said pay telephones.

25 Claims, 4 Drawing Figures

PAY TELEPHONE ALARM AND AUDIT SYSTEM

BACKGROUND

There are various loop start systems employed in the operation of pay telephones to be activated by the deposit of coins therein, two generally recognized types being adapted to use with the present invention, and namely the semi-post-pay and pre-pay operations. Heretofore, the coin vaults of these telephones have been collected on the basis of experience and separately operative alarm systems provided to protect against burglary. The coin operation requires the deposit of coins which pass through a rejector for accepting genuine coins that operate tone burst means identifiable with coins of distinct denomination i.e. 5¢, 10¢ and 25¢. The accepted coins are passed through or are held temporarily in a hopper, and in the latter case to be released by positive voltage applied to a coin relay (pre-pay) and collected in the vault, or returned by negative voltage applied thereto. Pre-pay systems require the deposit of an initial coin before placing a call, to be held in the hopper and returned or collected by means of the coin relay, as when the call is completed.

When a pay phone call is made, the coin tone bursts have been tabulated by operator personnel or the like, and with a sufficient monetary deposit, or by the establishment of credit, the circuit is established by said operator through the line equipment, so that the call can be completed. The dialed telephone number passes through various equipment in a central office or offices until it reaches the connector of the number dialed, whereupon a last mentioned connector activates the ringing generator to ring the telephone instrument of the number called. An object of this invention is to use existing telephone equipment and systems, and preferably the pre-pay loop start system; and taking particular advantage of the coin tone generator and coin relay functions provided in the existent telephone instruments. For example, the coin tone generator is activated by coins passing through a coin switch module to generate bursts of tone corresponding by number to the denomination of the coins deposited, and the coin relay is an electrical switching device having a coil winding and armature actuated thereby with positive or negative D.C. voltage to disburse the coins. Heretofore, the tones were transmitted over the telephone lines to enable the operator to recognize the coin denomination by the number of bursts. With the present invention, the tone bursts are transmitted to counter means and the count thereof transmitted therefrom to be tabulated in memory means; immediately tabulated in semi-post-pay operations, and held in abeyance means for subsequent tabulation in pre-pay operations.

Heretofore, the date of collection and the amount of money collected from pay phones has been noted on an activity sheet for each particular pay phone. Using these facts as experience, the collection period for a phone is either lengthened or shortened, so that the telephone coin collection vaults do not become overfilled with the result of phone inoperation. For example, some phones do not maintain good collection periods, such as those located at or near beaches, military bases, seasonal resorts, theatres, schools, etc., and consequently these phones often become inoperative because of over filled vaults. It is an object of this invention to provide a system wherein the use experience factor of phones is no longer the criteria, whereby the coinage in each phone will be available in the form of instantly available tabulations, and for the advantageous purpose of being collected before they have been overfilled, thereby removing all guess work from the collection process.

Heretofore, coin telephone alarms have been of two types. The first being the local noise alarm and the second being a silent alarm. Local alarms are activated by a switch mounted in the coin telephone, and they are audible for three to five hundred feet. Silen alarms switch on an alert in the central but have the disadvantage of overhead wiring and a second line run which are easily detected. In any case there are seldom enough cable pairs available to provide for all coin telephones in a given area, and as a result the cost and complexity of these silent alarm systems makes them impractical. On the contrary the anti-burglar function of the present invention is very practical since there is no extra overhead wiring and because there is no requirement for a second cable pair. Accordingly, the present invention provides a signal generator activated by a vault switch to transmit a distinguishable alarm signal over the normal telephone lines and thereby recycle the memory means; so that when a collection or burglary does occur the amount of money in the pay phone is known in one of the memory means and a concurrent alarm is activated in the central office, by an audible means or by illumination of a light emitting diode.

The function of the system is to preserve the total tabulation of memory means, whether the coin telephone is deliberately collected or burglarized and thereby recording the coinage in the vault at that point in time. The vaults of pay telephones are characterized by a collection box that is removable and not replaceable until reprocessed. In practice, reprocessing of the coin collection boxes is done in a collection center, an accounting office, where the boxes are opened and a coin count is made, whereupon the said boxes are keyed and/or reset for subsequent insertion into a pay phone. An unprocessed box is not reinsertable, and the aforesaid vault switch is inoperable during insertion of the box; only removal of said box will actuate the vault switch. The present invention eliminates the need to count the coinage from each collection box, thereby increasing, more than tripling, the counting ability in the coin collection centers, to be limited only by the per hour capability of present day coinage counters. Inherently, the office work involved for individual vault counting is eliminated and the revenue comingled and forwarded in common to the counting facility to be conformed with the computerized accounting.

SUMMARY OF INVENTION

The monitor system of the present invention is a unit system housed within the central office, for the purpose of tabulation and storing the amount of money collected by coin telephones, and to provide security against burglaries thereof, it being an object to provide these advantages with minimal change to the existing equipment. These tabulation and security functions are accomplished by means of a binary counter activated by the coin tone bursts transmitted over the normal telephone lines of loop system pay telephones in order to count the coin deposits which are stored in coin vaults for subsequent collection. In semi-post-pay operations, the coin count is transmitted directly into memory means; and, in pre-pay operations the coin count is transmitted to abeyance means and held for subsequent disbursement. Pre-pay operation is preferred wherein coins are held in a hopper until disbursed by a collect or return voltage. Therefore, when the coin tone bursts are followed by a negative coin return voltage, the count is dropped from the abeyance means; and when they are followed by a positive collect voltage the tabulation is then transmitted to and stored in one of two memory means concurrently with the coin collection. A feature is that the coin vault switch and signal generator operates upon removal of the coin box to energize an alarm relay and a sequence relay that recycles the memory means. The two memory means are then alternately recycled to a null condition and put into circuit with the counter means by the operation of the vault switch and signal generator when the coin box is removed for collection, or burglarized. And the memory means taken out of circuit with the counter means retains tabulated accumulation of coin collection for subsequent withdrawal by computer readout.

DRAWINGS

The various objects and features of this invention will be fully understood from the following detailed description of the typical preferred forms and applications thereof, throughout which description reference is made to the accompanying drawings, in which.

PREFERRED EMBODIMENT

Figure 1:
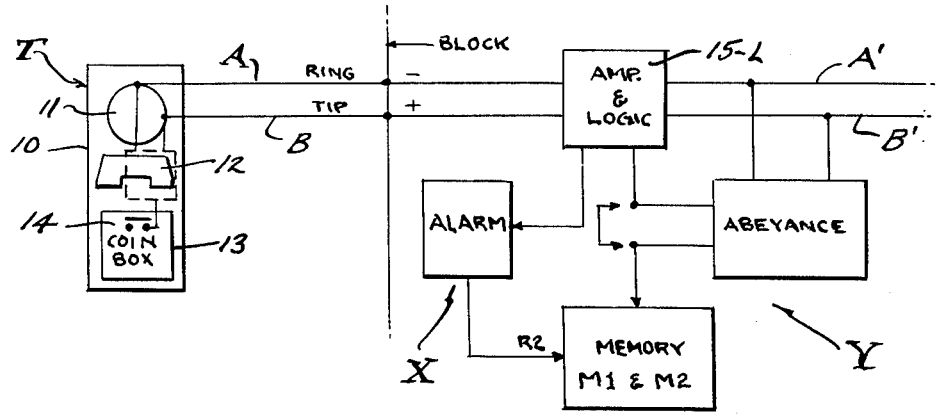
FIG. 1 is a schematic diagram of the general relationship of the alarm and collection means comprising the present invention.

This invention relates to a collection and alarm system for pay telephones and is operable with loop start systems where circuit continuity is established by lifting the handset; to be distinguished from ground start systems where a first coin must be deposited to put a ground on the telephone line. Further, there are two types of coin telephones which are preferred for use with the present invention; the three-slot pay phones, modified to have a coin tone generator and coin trigger switches; and the single-slot pay phones which are normally equipped with a coin tone generator and coin trigger switches. Still further, it is the semi-post-pay and pre-pay telephones which have the aforementioned adaptability to be used in combination with the present invention to have circuit continuity upon lifting of the handset, and to transmit coin tone bursts according to the denomination of the coins deposited through the slot or slots.

Telephone systems involve a power supply and office equipment for support of the field equipment comprised of the many telephone instruments with their definitive call numbers. All phones are connected to terminal blocks in a central office, so that when a call is dialed it will be transmitted through a series of switch connectors reaching the connector dialed (number), whereupon a ringing generator is activated. It is normal for telephone systems to be battery powered with 48 volts D.C. and for the ringing generator to produce 105 volts A.C. The line voltages are conducted by a cable pair for each telephone, a positive tip line B and a negative ring line A, extending between the telephone T and office terminal block. The phone instrument T is illustrated as a pay telephone embodied in a case 10 having a dialing means 11, and carrying a handset 12, and with a removable coin box 13, and all of which are usual in every respect. In accordance with this invention, there is a vault switch 14, similar to or the same as the coin box alarm switches hereinabove referred to and operable only upon removal of the coin box 13 from the case 10. The telephone lines A and B extend through the terminal block to a tone amplifier 15 that boosts the various signals for processing with other office equipment and to be transmitted on through a logic means L which sorts out the coin tone bursts from dialing signals from the voice and/or other like transmission signals. As shown, the transmission signals continue on lines A' and B'. The foregoing are the system elements to which the collection and alarm system of the present invention is adapted.

Figure 2:
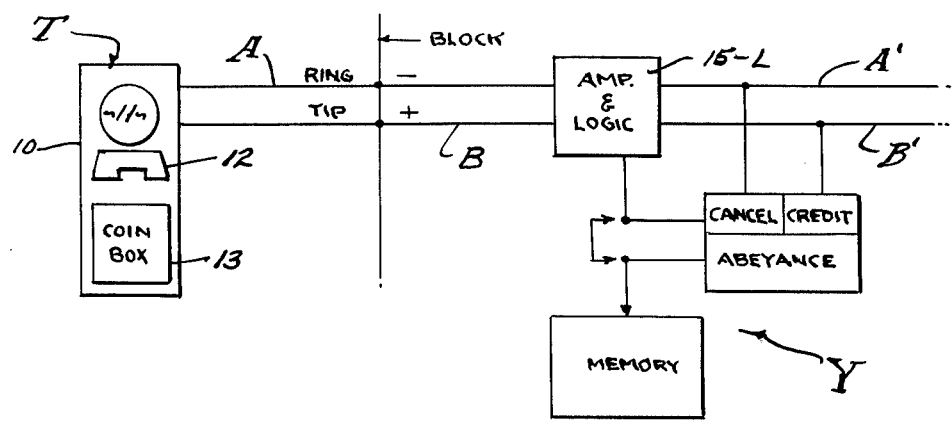
FIG. 2 is a schematic diagram of the collection means related to the telephone system.
Figure 3:
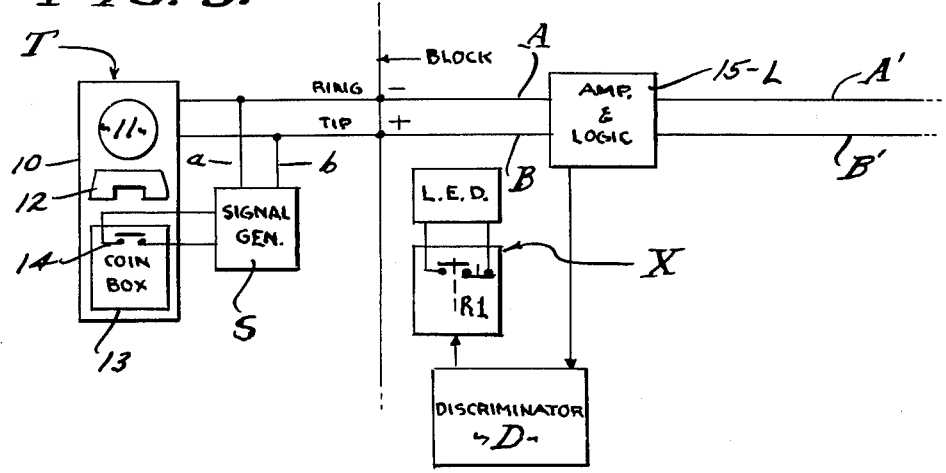
FIG. 3 is a schematic view of the alarm means related to the telephone system. And, FIG. 4 is a schematic diagram of the entire cooperative system period as an alarm and collection system for pay telephones.
Figure 4:
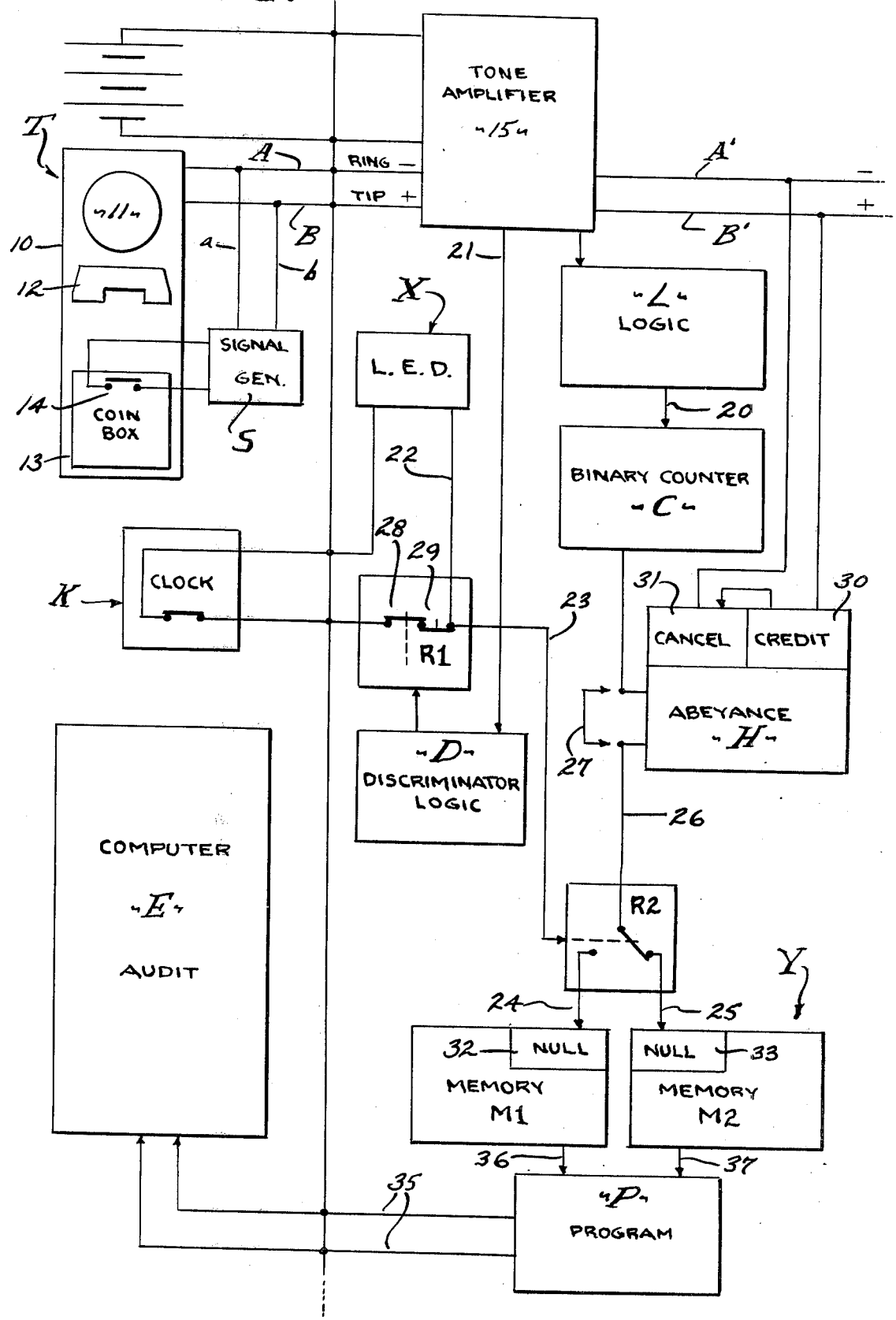

FIG. 1 of the drawings illustrates the general relationship of field and office equipment, tied together by the "tip" and "ring" lines B and A. All transmission signals, including the alarm signal, are conducted by the cable pair A-B, and connected through the terminal block to the amplifier 15 and logic means L. In accordance with the present invention, there is an alarm means X and a collection means Y, the former being illustrated in FIG. 3 and the latter in FIG. 2, the cooperative combination of the means X and Y being illustrated in FIG. 4. The pay telephone is provided with a signal generator means S activated by the vault switch 14, and the central office is supplemented by a counter means C, a discriminator means D, an alarm relay R1, a sequence relay R2, a pair of memory means M1 and M2, a program means P, and computer means E. The signal generator means S is powered by the line voltage to produce a distinctive signal when a coin box 13 is removed, and this signal is selected by the discriminator means D to operate the alarm relay R1 that presents an alert in the central office and to operate the sequence relay R2 that shifts the output of counter means C alternately between memory means M1 and M2. With semi-post-pay operation the coinage drops directly into the coin vault, in which case the counter means C counts each coin for accumulative tabulation as a credit in the memory means in circuit therewith. With the more sophisticated pre-pay operation the coinage is held in a hopper for subsequent disbursement, in which case the counter means C is in circuit to the memory means through an abeyance means H that holds the coin count for credit or debit subject to reception of positive or negative voltage applied to collect or return the coinage, respectively.

The signal generator S is operated by the line voltage available (48 v. D.C.) at the telephone instrument, and draws current momentarily when the switch 14 is closed by removal of the coin box 13. The means S includes an electronic circuitry that produces a signal distinguishable from dialing signals and from coin tone bursts and the like, and which is connected to the cable pair A-B by jumpers $a$ and $b$. In practice, the signal generator means S will be a small component of and installed within the case 10 of the telephone T.

The counter means C is operated by an office power supply (not shown) and is responsive to the coin tone bursts and thereby counts the coinage passing into and/or through the telephone hopper, as the case may be with either pre-pay or semi-post-pay operations. The coin tone bursts are transmitted to the counter means C via connection 20 from the tone amplifier 15 and logic means L and determined as a credit as by the process of electronic binary counting; one burst accounting for each 5¢ credit. The means C produces credit information in a form to be stored in the memory means M1 and M2, and preferably to be temporarily held in the abeyance means H. Essentially therefore, the counter means C is a converter that changes the coin tone bursts into credit information suitable for memory storage and computer readout; although it is to be understood that the tone bursts per se can be directly stored as credit information.

The discriminator means D is operated by the office power supply (not shown) and is responsive to the distinguishable signal generated by the signal generator means S as caused by opening of the coin box 13. The signal from means S is transmitted to the discriminator means D via connection 21 from the tone amplifier 15 and detected thereby to produce an operational signal to an alarm relay R1 and to the sequence relay R2, next to be described. The alarm relay R1 and sequence relay R2 operate simultaneously in response to the output of the discriminator means D, the former to initiate an alert and the latter to confirm a collection or a burglary, as the case may be.

The relays R1 and R2 are energized by the output of the discriminator means D to simultaneously report the act of removing the coin box 13 by activating an alarm and by recording the credit contained in the coin box. Alarm relay R1 is, for example, a single pole single throw relay responsive to the operational signal through connection 21, while the relay R2 is, for example, a two pole double throw relay, or the like, responsive to repeated operational signals through connection 23 to sequentially alternate circuit continuity between connections 24 and 25 to the memory means M1 and M2 respectively. The alarm means can vary widely and is shown as a visual LED, a light emitting diode, responsive through a holding circuit 28 of relay R1 to remain illuminated until said circuit is dropped by opening of switch 29. Thus, the LED alarm remains visible until cancelled by manual operation, or by suitable automation, of the reset switch 29.

The memory means M1 and M2 are the same or identical and either capable of receiving the credit information of the coin tone bursts or information from the counter means C, in the form of information tabulated as credited and transmitted thereto by the connections 24 and 25 respectively. The transmission of credit information is through either line 24 or 25, whereby the memory means M1 and M2 are alternately active in tabulating the said credit information. The said memory means M1 and M2 are operated by the office power supply (not shown) and each is independently capable of accumulating the credit information emanating as a result of successive telephone transactions, through line 26 from the counter means C, or through the abeyance means H next to be described. Circuit continuity established through connections 24 or 25 initiates momentary operation of null means 32 or 33 respectively, erasing previously stored credit information in preparation of memory means M1 or M2 for subsequent storage of credit information. The preceeding storage of credit information is retained in the memory means M1 or M2 previously employed to tabulate the same, on an alternate basis as controlled by relay R2.

The retention of credit information tabulated in either memory means M1 or M2 from the preceding time collection period is of prime importance and unintentional nullification by means 32-33 is prevented in the control of relay R2 through connection 23. As shown, a single operation of relay R2 is assured for each authorized collection, or burglary, by energization through the holding relay R1 which requires resetting for each successive transaction. In other words, there is a single alarm and memory audit when the coin box 13 is removed, regardless of possible repeated operation of the coin box switch 14, and the system subject only to deliberate resetting of relay R1.

The abeyance means H is operated by the office power supply (not shown) and intercepts the credit information from counter means C via connection 26 disrupted by a jumper 27 for pre-pay operation (as shown) and connected directly to relay R2 by said jumper 27 for semi-post-pay operation. The abeyance means H is a holding memory capable of assimilating the credit information emanating as a result of each successive telephone transaction from the counter means C, to hold said information until disbursed by either a positive coin collection voltage or the negative coin return voltage. As shown, the positive voltage from telephone lines A'-B' energizes credit means 30 operable to sequentially discharge the tabulated credit information through line 26 and to thereafter cancel said credit information from the abeyance means H as by producing a negative voltage that energizes a cancel means 31. The cancel means 31 is also responsive to negative voltage from the telephone lines A'-B' to cancel the said credit information from the abeyance means H.

The program means P is in circuit through the terminal block to the computer means E through lines 35 and comprises a network that receives identifying calls from the computer for access to the information stored in the memory means M1 and M2. The programmer means P sequences readout of the two memories through connections 36 and 37 respectively, for example by reading the credit information stored in memory M1 followed by reading the credit information stored in memory M2.

The collection and alarm system hereinabove described is provided with clock means K to deactivate the alarm means X operable through the relay R1. The clock means K is powered by the office power supply (not shown) and is adjustable to establish a time period during which the alarm circuit is opened so as to permit authorized collections without alarm.

The collection and alarm system operates as follows: The person using the coin pay telephone lifts the handset and deposits the coin or coins needed to place a call. The coins pass through the coin rejector and through the coin switch module which triggers the coin tone generator so as to send accountable coin tone bursts over the telephone lines. The electronic network of this collection and alarm system is simultaneously activated and the said coin tone bursts received by the counter means C. In pre-pay operation the coin bursts are then held in abeyance means H, and alternately in semi-postpay operation the coin tone bursts go directly into memory. In pre-pay operation it is the positive or negative disbursement voltage which determines the credit or debit from abeyance means H, the former going into memory. The information stored in the memory banks, a pair thereof, is retrieved by using a computer having readout capability, which calls upon the telephone by its identification number to record the credit information in the two memories. The computer network of the company operation involved then processes the retrieved information in the form of printouts or suitable format which the company employs. The printouts are then distributed and employed as circumstances require as related to the pay telephones involved. It will be seen that the pay phone equipment is to be provided with a simple signal generator S, while the remainder of the equipment is supplemented to the office equipment substantially without change. As illustrated, the system is wired into the existing telephone office equipment at the present blocks and is responsive to the coin burst signals and to the vault switch and signal generator for operation as hereinabove described.

Having described only typical preferred forms and applications of my invention, I do not wish to be limited or restricted to the specific details herein set forth, but wish to reserve to myself any modifications or variations that may appear to those skilled in the art.

I claim:

1. A money collection totaling system for loop start telephones having a coin tone generator and coin hopper passing coins into a coin vault with a vault switch operable by removal of a coin box therefrom, said tone generator being connected to a telephone cable pair to transmit tone bursts thereover according to the denomination of coins deposited through the hopper, and including; a distinguishable signal generator means connected to the telephone cable pair and controlled by said vault switch to be energized thereby and to transmit a distinguishable signal thereover when said vault switch is operated, a discriminator means connected to the telephone cable pair and responsive to said distinguishable signal to produce an operational signal, memory means to be connected to an extension of the said cable pair remote from the telephone to record the tone bursts as information, and relay means in circuit with and actuated by the operational signal from the discriminator means to disconnect the said memory means from said remote cable pair when the vault switch is operated by removal of the coin box to store money collection information in said memory means.

2. The loop start telephone money collection system as set forth in claim 1, wherein computer means is in circuit with the said memory means to retrieve the said money collection information.

3. A money collection totaling system for loop start telephones having a coin tone generator and a coin hopper and trigger switch for releasing coins into a coin vault with a vault switch operable by removal of a coin box therefrom, said coin tone generator and trigger switch being connected to a telephone cable pair to transmit coin tone bursts according to the denomination of the coins deposited into the hopper and to conduct discriminate switching voltages to alternately return coins from the hopper and to pass coins into said coin vault for collection respectively, and including; a distinguishable signal generator means connected to the telephone cable pair and controlled by said vault switch to be energized thereby and to transmit a distinguishable signal thereover when said switch is operated, a discriminator means connected to the telephone cable pair and responsive to said distinguishable signal to produce an operational signal, abeyance means connected to an extension of the said cable pair remote from the telephone to hold the tone bursts as money collection information and with cancel means and credit means disbursing the said tone bursts information in response to said discriminating switching voltages according to the coin return and collection at the telephone, a pair of money collection memory means to be connected in circuit with the said abeyance means to record the tone bursts as information, and relay means in circuit with and alternately actuated by the operational signal from the discriminator means to selectively disconnect each money collection memory means in circuit with the abeyance means when the vault switch is operated by removal of the coin box to alternately store said tone burst information in one of said pair of money collection memory means.

4. The loop start telephone money collection system as set forth in claim 3, wherein computer means is in circuit with the said pair of money collection means to retrieve the said tone burst information.

5. An alarm and money collection totaling system for loop start telephones having a coin tone generator and a coin hopper passing coins into a coin vault with a vault switch operable by removal of a coin box therefrom, said tone generator being connected to a telephone cable pair to transmit tone bursts according to the denomination of coins deposited through the hopper, and including; a distinguishable signal generator means connected to the telephone cable pair and controlled by said vault switch to be energized thereby and to transmit a distinguishable signal thereover when said vault switch is operated, a discriminator means connected to the telephone cable pair and responsive to said distinguishable signal to produce an operational signal, a first relay means in circuit with and actuated by the operational signal from the discriminator means when the coin box is removed to operate the vault switch, an alarm means energized by said first relay means, and money collection memory means connected to an extension of the said cable pair remote from the telephone to record the tone bursts as information, and a second relay means in circuit with and actuated by the operational signal from the discriminator means to disconnect the said memory means from said remote cable pair when the vault switch is operated by removal of the coin box to store money collection information for subsequent retrieval.

6. The alarm and money collection system as set forth in claim 5, wherein a pair of said money collection memory means are alternately connected to the extension of the said cable pair remote from the telephone to record the tone bursts as money collection information, and wherein each of said money collection memory means is alternately connected to said extension of the said cable pair by said second relay means actuated by the operational signal from the discriminator means to store said money collection information for subsequent retrieval.

7. The alarm and money collection system as set forth in claim 5, wherein a computer means is in circuit with the money collection memory means to audit the said money collection information.

8. The alarm and money collection system as set forth in claim 5, wherein a pair of said money collection memory means are alternately connected to the extension of the said cable pair remote from the telephone to record the tone bursts as information, wherein each of said money collection memory means is alternately disconnected from said extension of the said cable pair by said second relay means actuated by the operational signal from the discriminator means to store said money collection information for subsequent retrieval, and wherein a computer means is in circuit with the money collection memory means to audit the said money collection information.

9. The alarm and money collection system as set forth in claim 5, wherein a pair of said money collection memory means are alternately connected to the extension of the said cable pair remote from the telephone to record the tone bursts as money collection information, wherein each of said money collection memory means is alternately disconnected from said extension of the said cable pair by said second relay means actuated by the operational signal from the discriminator means to store said money collection information for subsequent retrieval, and wherein a computer means is in circuit with the said pair of money collection memory means through program means to sequentially audit the said money collection information stored therein respectively.

10. The alarm and money collection system as set forth in claim 5, wherein the first relay means comprises a holding circuit energizing said alarm means and said second relay means actuating the said money collection memory means in circuit therewith, there being means to release said holding circuit.

11. The alarm and money collection system as set forth in claim 5, wherein a pair of said money collection memory means are alternately connected by said second relay and sequencing means to the extension of said cable pair remote from the telephone to record the tone bursts as money collection information, and wherein the first relay means comprises a holding circuit energizing said alarm means and said second relay and sequencing means alternately disconnecting the said pair of money collection memory means from said cable pair to store said money collection information for subsequent retrieval, there being means to release said holding circuit.

12. The alarm and money collection system as set forth in claim 5, wherein the first relay means comprises a holding circuit energizing said alarm means and said second relay means actuating the said money collection memory means in circuit therewith, there being means to release said holding circuit, and wherein a computer means is in circuit with the money collection memory means to audit the said money collection information.

13. The alarm and money collection system as set forth in claim 5, wherein a pair of said money collection memory means are alternately connected by said second relay and sequencing means to the extension of said cable pair remote from the telephone to record the tone bursts as money collection information, wherein the first relay means comprises a holding circuit energizing said alarm means and said second relay and sequencing means alternately disconnecting the said pair of money collection memory means from said cable pair to store said money collection information for subsequent retrieval, there being means to release said holding circuit, and wherein a computer means is in circuit with the said pair of money collection memory means through program means to sequentially audit the said money collection information stored therein respectively.

14. An alarm and money collection totaling system for loop start telephones having a coin tone generator and a coin hopper and trigger switch for releasing coins into a coin vault with a vault switch operable by removal of a coin box therefrom, said coin tone generator and trigger switch being connected to a telephone cable pair to transmit coin tone bursts according to the denomination of coins deposited into the hopper and to conduct discriminate switching voltages to alternately return coins from the hopper and to pass coins into said coin vault for collection respectively, and including; a distinguishable signal generator means connected to the telephone cable pair and controlled by said vault switch to be energized thereby and to transmit a distinguishable signal thereover when said switch is operated, a discriminator means connected to the telephone cable pair and responsive to said distinguishable signal to produce an operational signal, a first relay means in circuit with and actuated by the operational signal from the discriminator means when the coin box is removed to operate the vault switch, an alarm means energized by said first relay means, abeyance means connected to an extension of the said cable pair remote from the telephone and responsive to the tone bursts to hold money collection information and with cancel means and credit means disbursing the said tone bursts information in response to said discriminating switching voltages according to the coin return and collection at the telephone, a pair of money collection memory means to be connected in circuit with the said abeyance means to record the coin tone bursts as information, and a second relay means in circuit with and alternately actuated by the operational signal from the discriminator means to selectively disconnect each money collection memory means in circuit with the abeyance means when the vault switch is operated by removal of the coin box to alternately store said tone burst information in one of said pair of money collection memory means for subsequent retrieval.

15. The alarm and money collection system as set forth in claim 14, wherein the abeyance means has an input from the said cable pair connection and an output to the said money collection memory means for pre-pay telephone operation, there being a jumper to be connected between said input and output for semi-post-pay telephone operation.

16. The alarm and money collection system as set forth in claim 14, wherein the said cable pair connection to the abeyance means is through counter means tabulating said money collection information from said coin tone bursts.

17. The alarm and money collection system as set forth in claim 14, wherein the said cable pair connection to the abeyance means is through binary counter means tabulating said money collection information from said coin tone bursts.

18. The alarm and money collection system as set forth in claim 14, wherein the abeyance means has an input from the said cable pair connection and an output, and wherein a pair of said money collection money means are alternately connected to said output to record the said money collection information, and wherein each of said money collection memory means is alternately responsive to actuation of said second relay means disconnecting the same from the said cable pair.

19. The alarm and money collection system as set forth in claim 14, wherein the abeyance means has an input from the said cable pair connection and an output, and wherein a computer means is in circuit with the money collection memory means to audit the said money collection information.

20. The alarm and money collection system as set forth in claim 14, wherein the abeyance means has an input from the said cable pair connection and an output, wherein a pair of said money collection memory means are alternately connected to said output to record the said money collection information, wherein each of said money collection memory means is alternately responsive to actuation of said second relay means disconnecting the same from said cable pair, and wherein a computer means is in circuit with the money collection memory means to audit the said money collection information.

21. The alarm and money collection system as set forth in claim 14, wherein the abeyance means has an input from the said cable pair connection and an output, wherein a pair of said money collection memory means are alternately connected to said output to record the said money collection information, wherein each of said money collection memory means is alternately responsive to actuation of said second relay means disconnecting the same from said cable pair, and wherein a computer means is in circuit with the said pair of money collection memory means through program means to sequentially audit the said money collection information stored therein respectively.

22. The alarm and money collection system as set forth in claim 14, wherein the abeyance means has an input from the said cable pair connection and an output, and wherein the first relay means comprises a holding circuit energizing said alarm means, and said second relay means disconnecting said abeyance means output to retain the money collection information in said credit memory means, there being means to release said holding circuit.

23. The alarm and money collection system as set forth in claim 14, wherein the abeyance means has an input from the said cable pair connection and an output, wherein a pair of said credit memory means are alternately connected by said second sequencing relay means to said output to record the said money collection information, and wherein the first relay means comprises a holding circuit energizing said alarm means and said second sequencing relay means alternately disconnecting the said pair of money collection memory means from the abeyance means to store said money collection information for subsequent retrieval, there being means to release said holding circuit.

24. The alarm and money collection system as set forth in claim 14, wherein the abeyance means has an input from the said cable pair connection and an output, wherein the first relay means comprises a holding circuit energizing said alarm means, and said second relay means disconnecting the said money collection memory means from the said abeyance means, there being means to release said holding circuit, and wherein a computer means is in circuit with the money collection memory means to audit the said money collection information.

25. The alarm and money collection system as set forth in claim 14, wherein the abeyance means has an input from the said cable pair connection and an output, wherein a pair of said money collection memory means are alternately disconnected by said second relay means from said output to record the said money collection information, wherein the first relay means comprises a holding circuit energizing said alarm means and said second relay means alternately disconnecting the said pair of money collection memory means from said abeyance means to store said money collection information for subsequent retrieval, there being means to release said holding circuit, and wherein a computer means is in circuit with the said pair of money collection memory means through program means to sequentially audit the said money collection information stored therein respectively.

* * * * *